US007532889B2

United States Patent
Kim

(10) Patent No.: US 7,532,889 B2
(45) Date of Patent: May 12, 2009

(54) HARD HANDOVER METHOD AND RADIO NETWORK CONTROLLER THEREFOR IN A MOBILE TELECOMMUNICATION SYSTEM

(75) Inventor: Young-Hun Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 541 days.

(21) Appl. No.: 11/431,916

(22) Filed: May 11, 2006

(65) Prior Publication Data

US 2006/0270406 A1 Nov. 30, 2006

(30) Foreign Application Priority Data

May 11, 2005 (KR) .................... 10-2005-0039424

(51) Int. Cl.
*H04W 36/00* (2009.01)
(52) U.S. Cl. .................. 455/442; 455/502; 455/513; 455/524; 370/252; 370/331; 370/335; 370/338; 370/503
(58) Field of Classification Search ............. 455/422.1, 455/442, 69, 115.3, 502, 513, 524; 370/252, 370/331, 335, 338, 356, 503
See application file for complete search history.

(56) References Cited

U.S. PATENT DOCUMENTS

2003/0007471 A1 1/2003 Terasawa et al.

2004/0121770 A1 6/2004 Tigerstedt et al.
2007/0190997 A1* 8/2007 Moon et al. .............. 455/422.1

FOREIGN PATENT DOCUMENTS

| EP | 1 401 225 A1 | 3/2004 |
| KR | 1020000001857 A | 1/2000 |
| KR | 1020020060391 A | 7/2002 |
| KR | 1020040056584 A | 7/2004 |
| KR | 1020060032541 A | 4/2006 |
| WO | WO 00/14907 | 3/2000 |

* cited by examiner

*Primary Examiner*—Danh Le
*Assistant Examiner*—Inder P Mehra
(74) *Attorney, Agent, or Firm*—Roylance, Abrams, Berdo & Goodman, LLP

(57) ABSTRACT

A hard handover method and a Radio Network Controller (RNC) therefor in a mobile telecommunication system are provided which can improve the performance of an interfrequency hard handover. The RNC stores information about a timing difference between first and second Node Bs for supporting a soft handover. When receiving, from a User Equipment (UE), a request for a hard handover from the first Node B to the second Node B, the RNC computes information about a timing difference between the Node Bs for the hard handover using the information about the timing difference between the Node Bs stored at a soft handover time. The RNC commands the second Node B and the UE to operate for the hard handover using the computed timing difference information.

16 Claims, 8 Drawing Sheets

(a)

(b)

HARD HANDOVER METHOD AND RADIO NETWORK CONTROLLER THEREFOR IN A MOBILE TELECOMMUNICATION SYSTEM

CROSS-REFERENCE TO RELATED APPLICATIONS

This application claims priority under 35 U.S.C. § 119 to application Ser. No. 2005-39424 filed in the Korean Intellectual Property Office on May 11, 2005 the entire disclosure of which is hereby incorporated by reference.

BACKGROUND OF THE INVENTION

1. Field of the Invention

The present invention generally relates to a mobile telecommunication system. More particularly, the present invention relates to a hard handover method and a radio network controller therefor in a mobile telecommunication system that can improve the performance of an interfrequency hard handover.

2. Description of the Related Art

In a mobile telecommunication system, handover technology is mandatory to provide seamless service to terminals on the move. A terminal on the move can request a handover, or a network for controlling the terminal can command the handover. When the terminal requests the handover, the network that is currently controlling the terminal newly allocates radio resources and makes the terminal use the newly allocated radio resources. When the network commands the handover for the terminal, the terminal is allowed to use other radio resources according to a need in an operation of the network.

For example, a Wideband Code Division Multiple Access (WCDMA) system serves as a CDMA-based system. In this system, different users receive services using identical frequency resources and different codes. The different users can receive the services because frequencies are different even when different frequency resources and identical codes are used.

For this reason, a service provider provides service at one or more frequencies in a region where a large number of users are located, and provides service at one frequency in a region where a small number of users are located. A user may move to a new service region, which uses only one frequency, from a region where a large number of users are located. In this case, the user must change to a new use frequency in order to receive a seamless service if the frequency of the new service region is different from that of the previous service region.

A conventional handover of the WCDMA system is an intrafrequency soft handover. However, an interfrequency hard handover is performed in the above-described case.

When the soft handover is performed, the terminal does not need to newly acquire synchronization because the terminal reports a timing difference between a handover target cell and the current cell in a call connection state to a system and the system makes the handover target cell ready for the handover using the reported timing difference.

On the other hand, when the hard handover is performed, its probability of success is lower than that of the soft handover. The hard handover requires a more precise handover algorithm than the soft handover.

When performing the interfrequency hard handover, the system makes the terminal measure the strength of a signal received from a cell with a different frequency and report the measured strength. The system sets the interfrequency hard handover using a reported value and commands the interfrequency hard handover for the terminal. At this time, the value reported from the terminal is different from that reported from a cell with the same frequency. A timing difference between the current cell and the cell with the same frequency is correctly reported, but a timing difference between the current cell and the cell with the different frequency is not correctly reported. This is because the terminal in the call connection state can search for the target cell with the different frequency, but cannot obtain correct timing information. Accordingly, when the interfrequency hard handover is performed, the system makes the target cell with the different frequency ready for the handover using timing information different from that used in the existing call connection state. Moreover, the system commands the terminal to newly acquire synchronization while performing the interfrequency hard handover. This hard handover is referred to as the timing re-initialized hard handover.

The timing difference relative to the target cell with the different frequency is not reported from the terminal when the interfrequency hard handover is performed. For this reason, when the target cell with the different frequency prepares for the handover, arbitrary timing information is basically used for synchronization in the terminal. When receiving an interfrequency hard handover command, the terminal is to newly acquire synchronization while the interfrequency hard handover is performed. Because a new synchronization acquisition is required for the interfrequency hard handover, a handover success probability decreases and therefore a call cut-off time increases when the interfrequency hard handover is performed.

Accordingly, there is a need for an improved method and radio network controller for hard handover in a mobile telecommunication system.

SUMMARY OF THE INVENTION

Exemplary embodiments of the present invention address at least the above problems and/or disadvantages and provide at least the advantages described below. Accordingly, an aspect of the present invention is to provide a hard handover method and a radio network controller therefor in a mobile telecommunication system that can prevent a decrease in a handover success probability due to a new synchronization acquisition process and reduce a call cut-off time due to an increase in a handover time when an interfrequency hard handover is performed.

In accordance with an exemplary aspect of the present invention, there is provided a Radio Network Controller (RNC) in a mobile telecommunication system for supporting a handover for a User Equipment (UE), comprising a memory for storing information about a timing difference between Node Bs when a soft handover is performed between a first Node B and a second Node B, a calculator for computing information about a timing difference between a second frequency of the first Node B and a first frequency of the second Node B using the stored information about the timing difference between the Node Bs and information about a timing difference between the first and second frequencies of the first Node B, when receiving, from the UE, a request for a hard handover from the second frequency of the first Node B to the first frequency of the second Node B, and a transmitter for commanding the second Node B and the UE to operate for the hard handover from the second frequency of the first Node B to the first frequency of the second Node B using the computed timing difference information.

In accordance with another exemplary aspect of the present invention, there is provided a hard handover method in a mobile telecommunication system in which a Radio Network Controller (RNC) supports a handover for a User Equipment (UE), comprising the steps of storing information about a timing difference between Node Bs when a soft handover is performed between a first Node B and a second Node B, computing information about a timing difference between a second frequency of the first Node B and a first frequency of the second Node B using the stored information about the timing difference between the Node Bs and information about a timing difference between the first and second frequencies of the first Node B, when receiving, from the UE, a request for a hard handover from the second frequency of the first Node B to the first frequency of the second Node B, and commanding the second Node B and the UE to operate for the hard handover from the second frequency of the first Node B to the first frequency of the second Node B using the computed timing difference information.

When a hard handover is performed in accordance with exemplary embodiments of the present invention, its probability of success is improved using information about a timing difference between Node Bs stored at a soft handover time. Of course, a call cut-off time due to the hard handover is reduced. That is, when timing information is not reported from a UE, the timing difference information for the hard handover is computed using the timing information previously maintained in the UE. The hard handover is performed using the computed timing difference information.

In an exemplary embodiment, the system stores the timing difference information reported from the UE in an internal table when an intrafrequency soft handover is performed. When an interfrequency hard handover is performed, the system obtains timing difference information unreported by the UE from an internal table, and commands the UE to operate for the interfrequency hard handover. When the interfrequency hard handover is performed, the UE does not perform a new synchronization acquisition process, such that a handover success probability is improved. Because a new synchronization acquisition time is not required, a call cut-off time can be reduced in the interfrequency hard handover.

BRIEF DESCRIPTION OF THE DRAWINGS

The above and other objects, aspects, and advantages of the present invention will be more clearly understood from the following detailed description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

Exemplary embodiments of the present invention will be described in detail herein below with reference to the accompanying drawings. In the following description, detailed descriptions of functions and configurations incorporated herein that are well known to those skilled in the art are omitted for clarity and conciseness.

Figure 1:
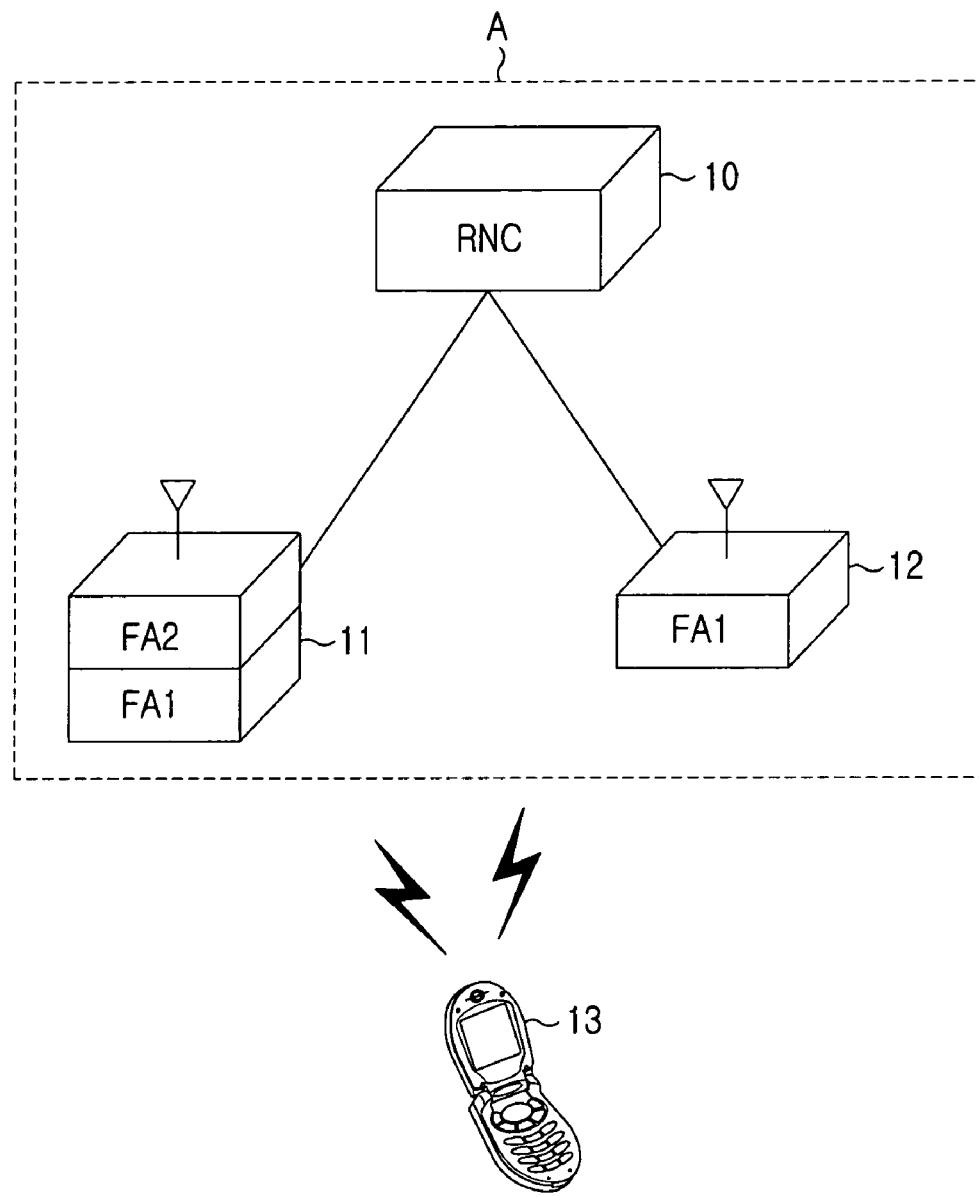
FIG. 1 illustrates a structure of a wideband Code Division Multiple Access (WCDMA) mobile telecommunication system.

FIG. 1 illustrates a structure of a conventional Wideband Code Division Multiple Access (WCDMA) mobile telecommunication system to which the present invention is applied.

Referring to FIG. 1, the WCDMA mobile telecommunication system includes a wireless network subsystem A and a User Equipment (UE) 13.

The wireless network subsystem A is provided with a Radio Network Controller (RNC) 10, a first Node B 11 using two assigned frequencies of Frequency Assignment 1 (FA1) and FA2, and a second Node B 12 using one assigned frequency of FA1. Herein, for simplification of explanation, the number of Node Bs is limited to 2, and the number of used frequencies is limited to 2.

The RNC 10 directly controls the first Node B 11 and the second Node B 12, and controls the UE 13 through the first Node B 11 or the second Node B 12.

As illustrated in FIG. 1, the first Node B 11 is designed to provide a service using another FA2 frequency because it is difficult for the service to be provided to a large number of users using one FA1 frequency in a region of the first Node B 11. On the other hand, the second Node B 12 is designed to use one FA1 frequency because its users can sufficiently receive service using only the one FA1 frequency in a region of the second Node B 12.

Exemplary embodiments of the present invention improve the performance of an interfrequency hard handover process, in other words a handover process from the FA2 frequency of the first Node B 11 to the FA1 frequency of the second Node B 12 when the UE 13 moves to the region of the second Node B 12 while using the service at the FA2 frequency of the first Node B 11.

In this case, the UE 13 does not report timing difference information relative to the FA1 frequency. To compute the timing difference information relative to the FA1 frequency, the system receives and stores in advance information about a timing difference between the FA1 frequency of the first Node B 11 and the FA1 frequency of the second Node B 12 from the UE for which the handover is performed from the FA1 frequency of the first Node B 11 to the FA1 frequency of the second Node B 12. Moreover, the system computes timing difference information relative to the UE requesting the interfrequency hard handover from the FA2 frequency of the first Node B 11 to the FA1 frequency of the second Node B 12.

A timing difference between FA1 and FA2 in the first Node B 11 and an offset between the UE 13 and the Node B are preset values. Accordingly, the timing difference information at the time of the hard handover from the FA2 frequency of the first Node B 11 to the FA1 frequency of the second Node B 12 can be computed using only the timing difference between the FA1 frequency of the first Node B 11 and the FA1 frequency of the second Node B 12.

The RNC 10 performs a function for storing the information about the timing difference between the FA1 frequency of the first Node B 11 and the FA1 of the second Node B 12 and computing the timing difference information relative to the UE requesting the interfrequency hard handover from the FA2 frequency of the first Node B 11 and the FA1 frequency of the second Node B 12.

Figure 2:
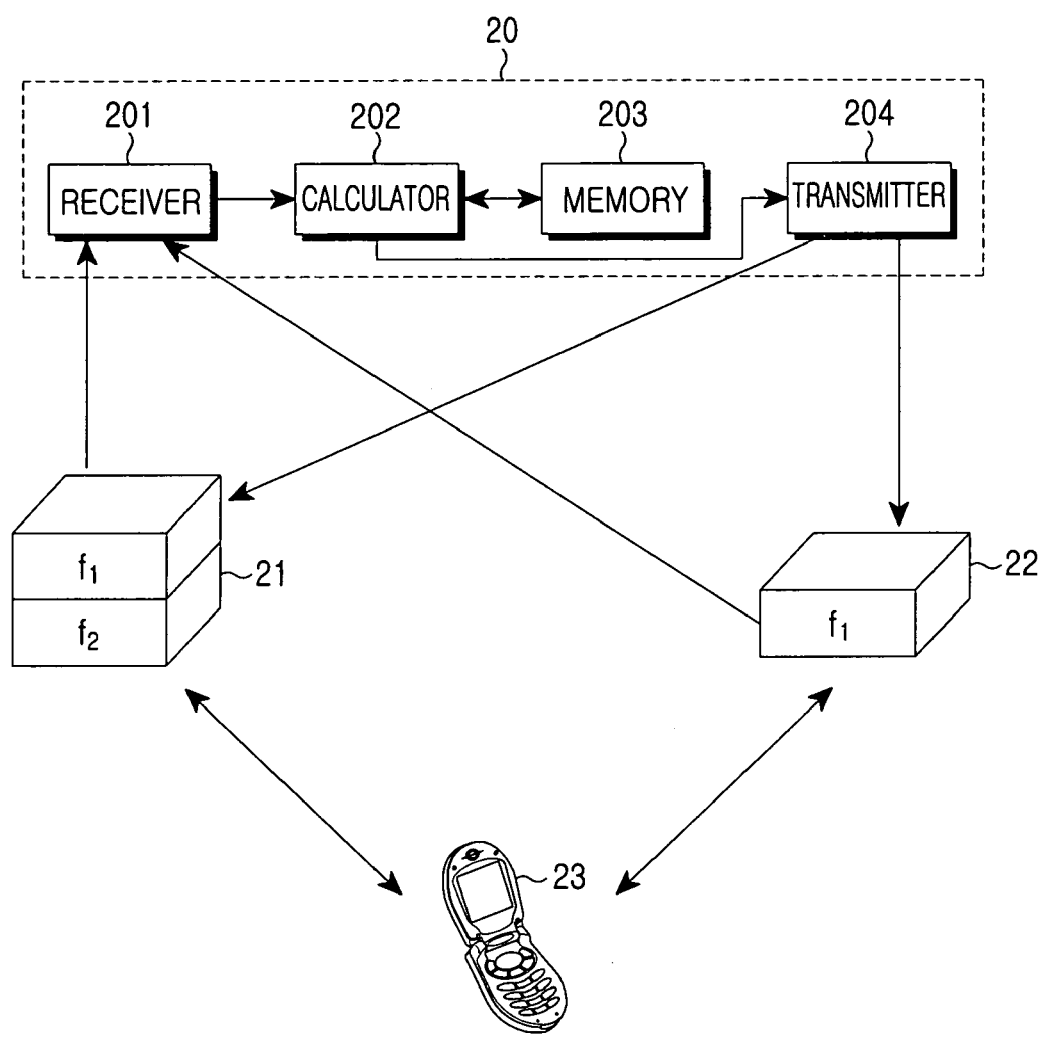
FIG. 2 is a block diagram illustrating a structure of a mobile telecommunication system with a Radio Network Controller (RNC) in accordance with an exemplary embodiment of the present invention.

FIG. 2 is a block diagram illustrating a structure of a mobile telecommunication system with an RNC in accordance with an exemplary embodiment of the present invention.

Referring to FIG. 2, the mobile communication system in accordance with the exemplary embodiment of the present invention includes an RNC 20, a first Node B 21 serving as a source Node B using two frequencies of $f_1$ and $f_2$, a second Node B 22 serving as a target Node B using one frequency of $f_1$, and a UE 23.

The RNC 20 stores information about a frequency-related timing difference between the Node B and the UE or the Node Bs for supporting a soft handover. Using the stored timing difference information, the RNC 20 computes timing difference information unreported from the terminal at a hard handover time.

For this, the RNC 20 includes a receiver 201, a calculator 202, a memory 203, and a transmitter 204. The receiver 201 receives timing information and so on. The memory 203 stores the information about the timing difference between the Node Bs for supporting the soft handover. When the UE requests the hard handover, the calculator 202 computes information about a timing difference between the source and target Node Bs using the information about the timing difference between the Node Bs stored at a soft handover time. The transmitter 204 commands the hard handover for the UE using the timing difference information computed in the calculator 202.

Figure 4:
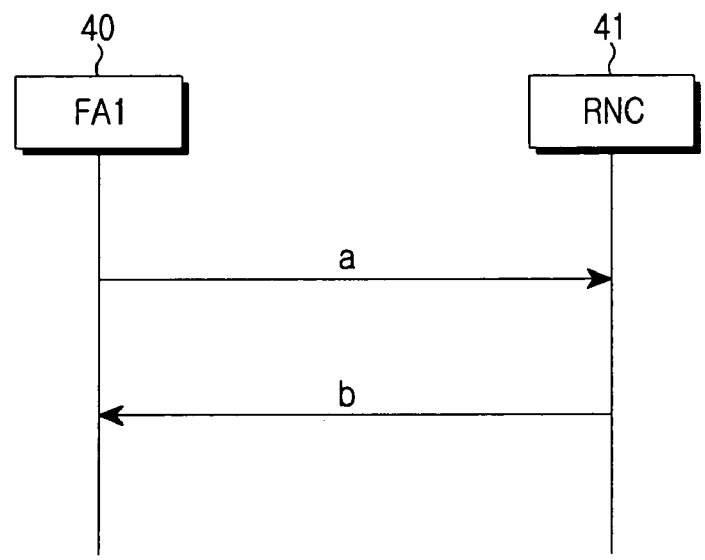
FIG. 4 illustrates a process for storing timing information and computing hard handover timing in the RNC.
Figure 4:
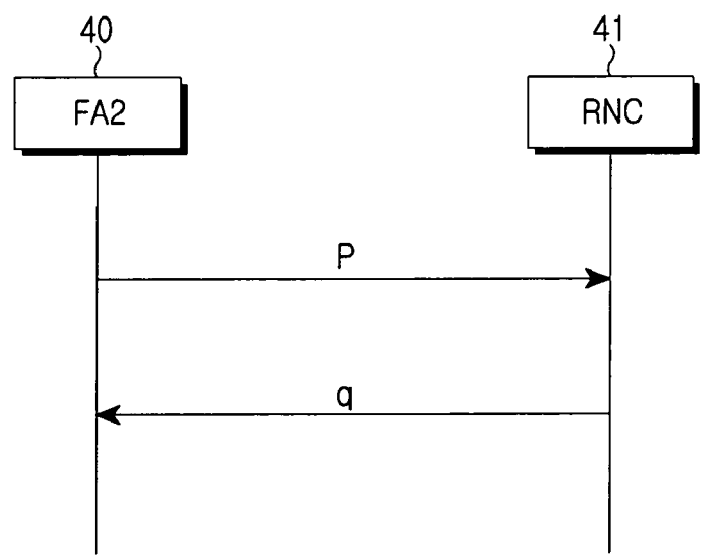

FIG. 4 illustrates a process for storing and computing timing difference information for the hard handover in the RNC in accordance with an exemplary embodiment of the present invention.

FIG. 4(*a*) illustrates a process for storing timing information.

When an interfrequency hard handover is performed, a UE does not report information about a timing difference between a first frequency of a current source Node B and a second frequency of a target Node B to the RNC (through the Node B). The RNC stores information about a timing difference between frequencies of the Node Bs reported from the UE at a soft handover time such that the system computes the unreported timing difference information.

In FIG. 4(*a*), the UE 40 is in a state in which an FA1 frequency of the source Node B is used and the intrafrequency soft handover, in other words the soft handover to the FA1 frequency of the target Node B is performed. At this time, the UE 40 reports, to the RNC 41, a timing difference between the FA1 frequencies used in the two Node Bs as indicated by "a".

The RNC 41 stores the timing difference reported from the UE 40 and timing information of the UE 40 in a call connection state at the FA1 frequency of the target Node B and accepts the soft handover as indicated by "b".

FIG. 4(*b*) illustrates an interfrequency hard handover process in accordance with an exemplary embodiment of the present invention. When the interfrequency hard handover is performed, the system computes information about a timing difference between different frequencies of the Node Bs using the stored information about the timing difference between the same frequencies of the Node Bs. According to a value of the computed timing difference information, the interfrequency hard handover process is performed in a state in which the UE does not newly acquire synchronization.

In FIG. 4(*b*), when the UE 40 using the FA2 frequency of the source Node B requests an interfrequency hard handover to the FA1 frequency of the target Node B as indicated by "p", the RNC 41 computes a timing difference between the FA2 frequency of the source Node B and the FA1 frequency of the target Node B.

Because the RNC 41 does not conventionally know a timing difference between the FA2 frequency of the source Node B and the FA1 frequency of the target Node B, it commands the UE 40 to acquire synchronization using arbitrary timing difference information relative to the FA1 frequency of the target Node B.

However, in accordance with an exemplary embodiment of the present invention, the RNC 41 computes a timing difference between the FA2 frequency of the source Node B and the FA1 frequency of the target Node B, performs a setup process suitable for synchronization of the UE 40 at the FA1 frequency of the target Node B, and notifies the UE 40 of the setup result, such that the UE 40 does not need to newly acquire synchronization.

On the other hand, the RNC is to be additionally provided with a function for determining whether currently stored information is valid. That is, the RNC stores a timing difference between the FA1 frequency of the source Node B and the FA1 frequency of the target Node B when a previous soft handover between the same frequencies is performed, and determines whether the currently stored information is valid while performing an interfrequency hard handover because the previously stored information becomes an invalid value when the source or target Node B is re-started in a particular state. Upon determining that the stored information is the invalid value, the RNC is not to use the stored value. In this case, the RNC is to perform the interfrequency hard handover by making the UE newly acquire synchronization according to the conventional method.

Figure 3:
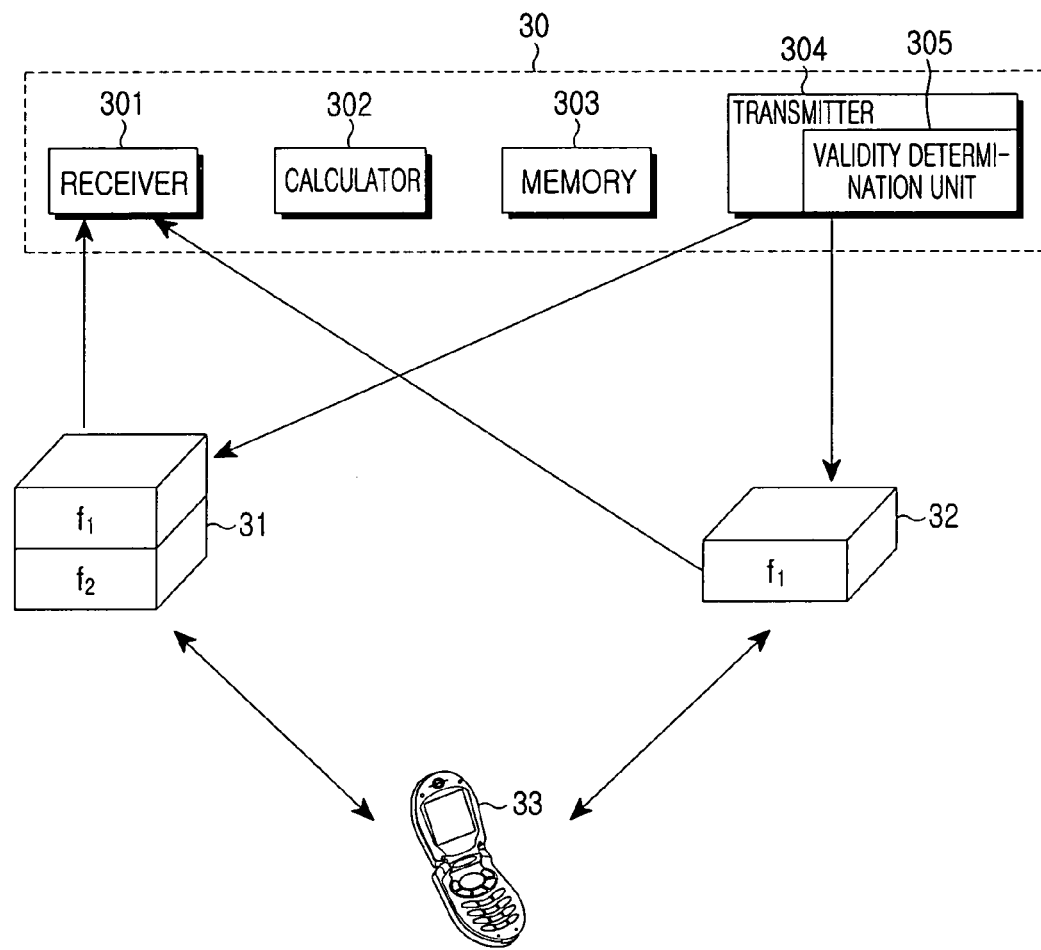
FIG. 3 is a block diagram illustrating a structure of a mobile telecommunication system with an RNC in accordance with another exemplary embodiment of the present invention.

FIG. 3 is a block diagram illustrating a structure of a mobile communication system with an RNC for determining whether stored timing difference information is valid in accordance with another exemplary embodiment of the present invention.

Referring to FIG. 3, the mobile communication system in accordance with the other exemplary embodiment of the present invention includes an RNC 30, a first Node B 31 serving as a source Node B using two frequencies of $f_1$ and $f_2$, a second Node B 32 serving as a target Node B using one frequency of $f_1$, and a UE 33.

The RNC 30 stores information about a frequency-related timing difference between the Node B and the UE or the Node Bs for supporting a soft handover. Using the stored timing difference information, the RNC 30 computes timing difference information unreported from the terminal at a hard handover time. Moreover, the RNC 30 determines whether the stored timing difference information is valid.

For this, the RNC 30 includes a receiver 301, a calculator 302, a memory 303, and a transmitter 304. The receiver 301 receives timing difference information and so on. The memory 303 stores the information about the timing difference between the Node Bs for supporting the soft handover. When the UE requests the hard handover, the calculator 302 computes information about a timing difference between the source and target Node Bs using the information about the timing difference between the Node Bs stored at a soft handover time. The transmitter 304 determines whether the timing difference information stored in the memory 303 is valid, and then commands the hard handover for the UE 33 according to a determination result. For this, the transmitter 304 is to be provided with a validity determination unit 305 for determining whether the timing difference information stored in the memory 303 is valid.

As described above, exemplary embodiments of the present invention can reduce a handover time because a UE does not need to newly acquire synchronization when an interfrequency hard handover is performed.

Because the UE conventionally changes the frequency at a particular time in the interfrequency hard handover, call cut-off instantaneously occurs. A call connection subsequent to the call cut-off is enabled after the UE changes the frequency and acquires synchronization. Therefore, exemplary embodiments of the present invention can reduce the call cut-off time by reducing the synchronization acquisition time. When the interfrequency hard handover is performed, the UE can reduce operating load necessary for the synchronization acquisition. The exemplary embodiments of present invention can prevent a synchronization acquisition failure and an interfrequency hard handover failure due to the synchronization acquisition, thereby increasing the probability of success in the interfrequency hard handover.

A hard handover method in the above-described mobile telecommunication system in accordance with an exemplary embodiment of the present invention will be described in detail with reference to the accompanying, drawings.

Figure 5:
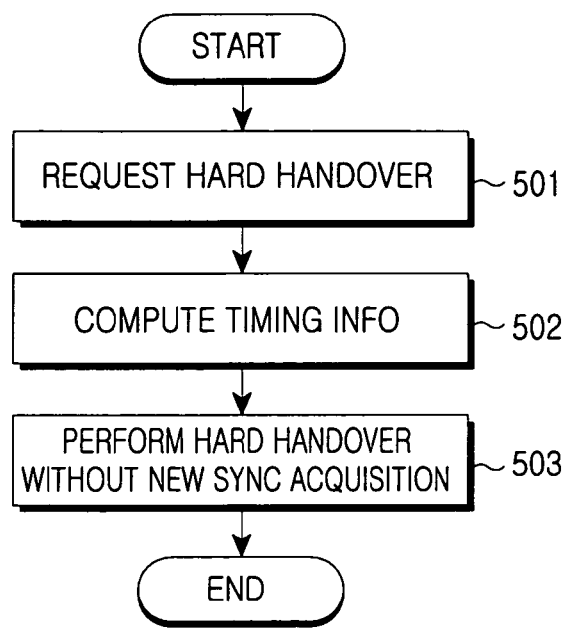
FIG. 5 is a flowchart illustrating a hard handover method in the mobile telecommunication system in accordance with a first exemplary embodiment of the present invention.

FIG. 5 is a flowchart illustrating a hard handover method in the mobile telecommunication system in accordance with a first exemplary embodiment of the present invention.

When the UE sends a hard handover request to the RNC through the source Node B (Step 501), the RNC computes information about a timing difference between the source and target Node Bs using timing difference information between the Node Bs stored in the memory at a soft handover time (Step 502).

The hard handover for the UE is performed using the timing difference information computed in the RNC (Step 503). That is, the hard handover for the UE is performed using the timing difference information computed in the RNC without a new synchronization acquisition.

Figure 6:
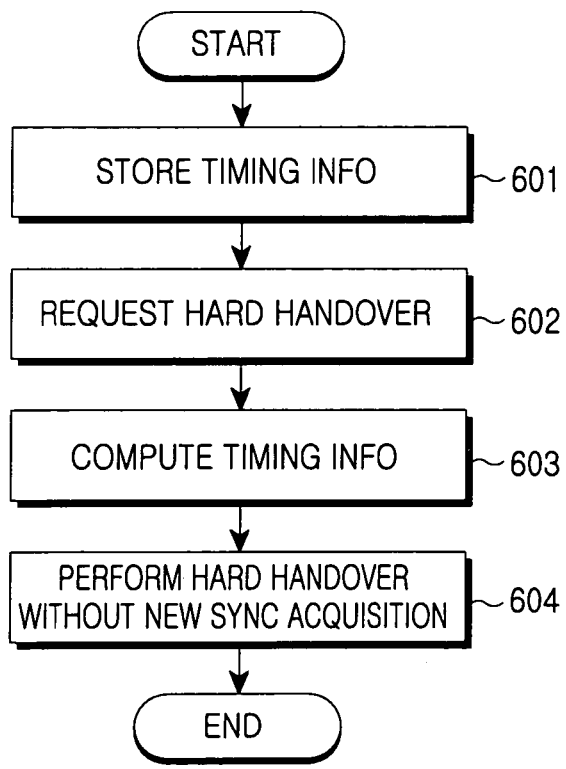
FIG. 6 is a flowchart illustrating a hard handover method in the mobile telecommunication system in accordance with a second exemplary embodiment of the present invention.

FIG. 6 is a flowchart illustrating a hard handover method in the mobile telecommunication system in accordance with a second exemplary embodiment of the present invention.

The RNC receives information about a timing difference between the source and target Node Bs at the soft handover time and information about a timing difference between the source Node B and another Node B at the soft handover time through the receiver, and stores the received information in the memory (Step 601).

When the UE sends a hard handover request to the RNC through the source Node B (Step 602), the RNC computes information about a timing difference between the source and target Node Bs using information about a timing difference between frequencies of the Node Bs stored in the memory at the soft handover time (Step 603).

The hard handover for the UE is performed using the timing difference information computed in the RNC (Step 604). That is, the hard handover for the UE is performed using the computed timing difference information without a new synchronization acquisition.

Figure 7:
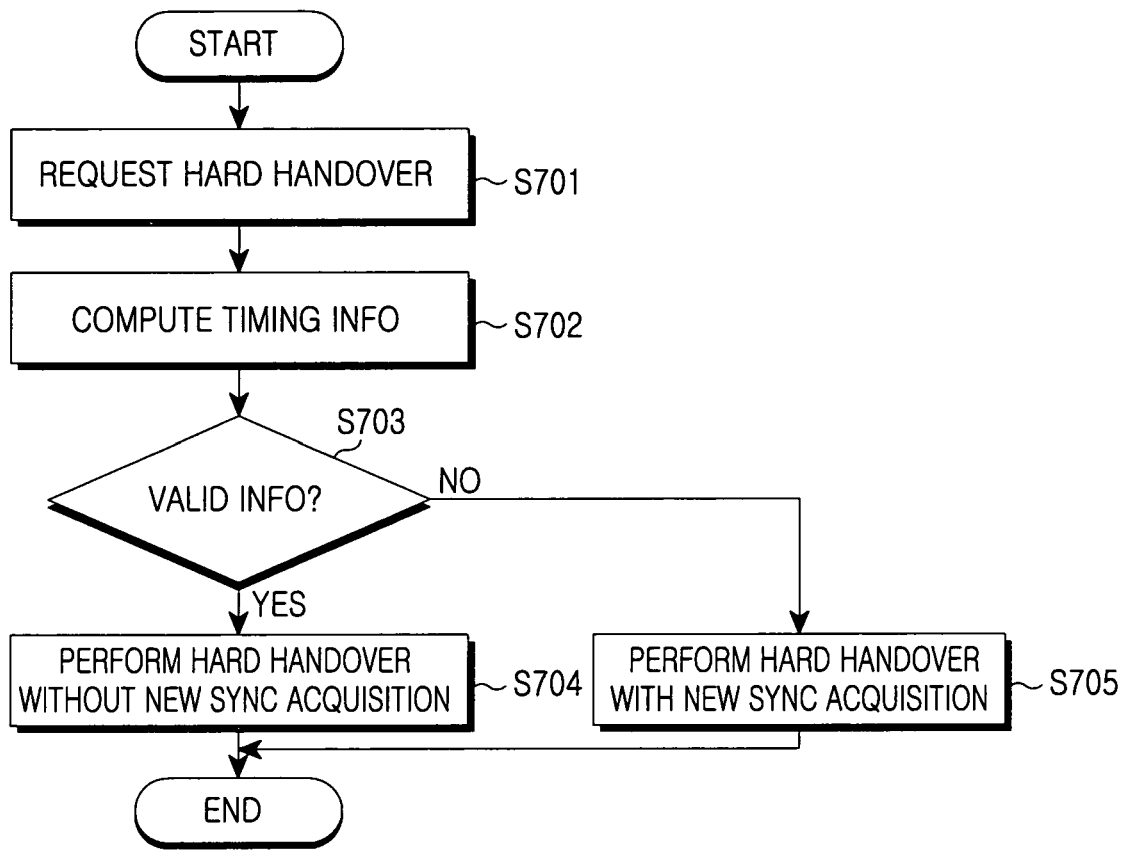
FIG. 7 is a flowchart illustrating a hard handover method in the mobile telecommunication system in accordance with a third exemplary embodiment of the present invention.

FIG. 7 is a flowchart illustrating a hard handover method in the mobile telecommunication system in accordance with a third exemplary embodiment of the present invention.

When the UE sends a hard handover request to the RNC through the source Node B (Step S701), the RNC computes information about a timing difference between the source and target Node Bs using information about a timing difference between the Node Bs stored in the memory at the soft handover time (Step S702). The RNC determines whether the timing difference information stored in the memory is valid while performing the hard handover (Step S703).

At this time, the RNC makes the validity determination by asking the two Node Bs whether an event capable of varying timing, for example, a Node B OFF event, has occurred after receiving the information about the timing difference between the Node Bs.

If the stored timing difference information is valid as a determination result, the hard handover for the UE is performed using the computed timing difference information without a new synchronization acquisition (Step S704).

However, if the stored timing difference information is invalid, the UE newly acquires synchronization and then the hard handover is performed (Step S705).

Figure 8:
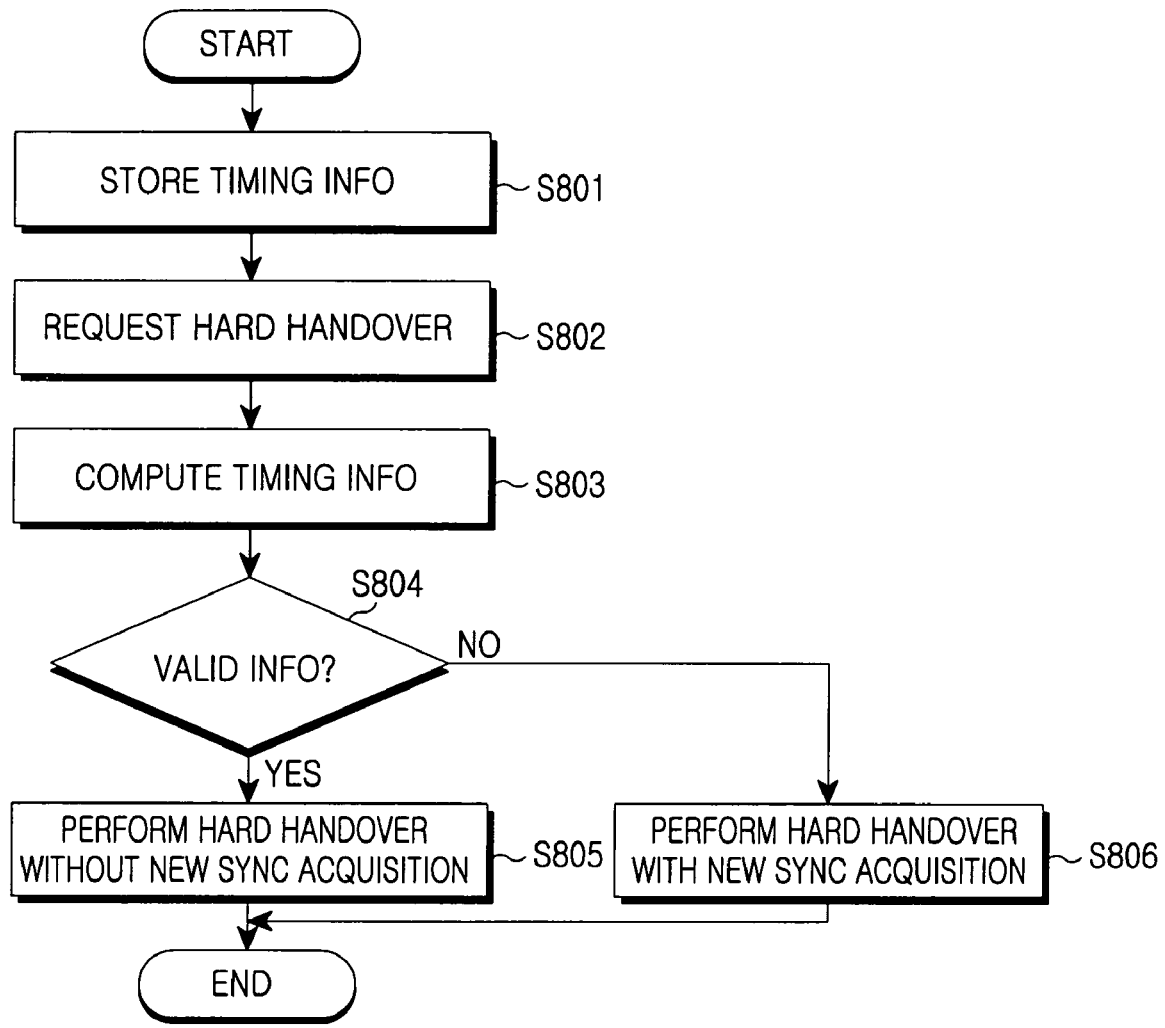
FIG. 8 is a flowchart illustrating a hard handover method in the mobile telecommunication system in accordance with a fourth exemplary embodiment of the present invention.

FIG. 8 is a flowchart illustrating a hard handover method in the mobile telecommunication system in accordance with a fourth exemplary embodiment of the present invention.

The RNC receives information about a timing difference between the source and target Node Bs at the soft handover time, information about a timing difference between frequencies of the same Node B, and information about an associated frequency offset between the UE and each Node B through the receiver, and then stores the received information in the memory (Step S801).

When the UE sends a hard handover request to the RNC through the source Node B (Step S802), the RNC computes information about a timing difference between the source and target Node Bs using the information about the timing difference between the Node Bs stored in the memory at the soft handover time (Step S803).

When the information about the timing difference between the source and target Node B is computed, there are considered the information about the timing difference between the different frequencies of the same Node B and the information about the associated frequency offset between the UE and each Node B as well as the information about the timing difference between the source and target Node Bs stored in the memory of the RNC at the soft handover time. However, because the offset information is detected as one constant, the information about the timing difference between the Node Bs stored at the soft handover time is mainly considered.

The RNC determines whether the timing difference information stored in the memory is valid while performing the hard handover (Step S804).

If the stored timing difference information is valid as a determination result, the hard handover for the UE is performed using the computed timing difference information without a new synchronization acquisition (Step S805).

However, if the stored timing difference information is invalid, the UE newly acquires synchronization and then the hard handover is performed (Step S806).

Next, an example of applying the above-described hard handover method to the WCDMA system will be described.

Figure 9:
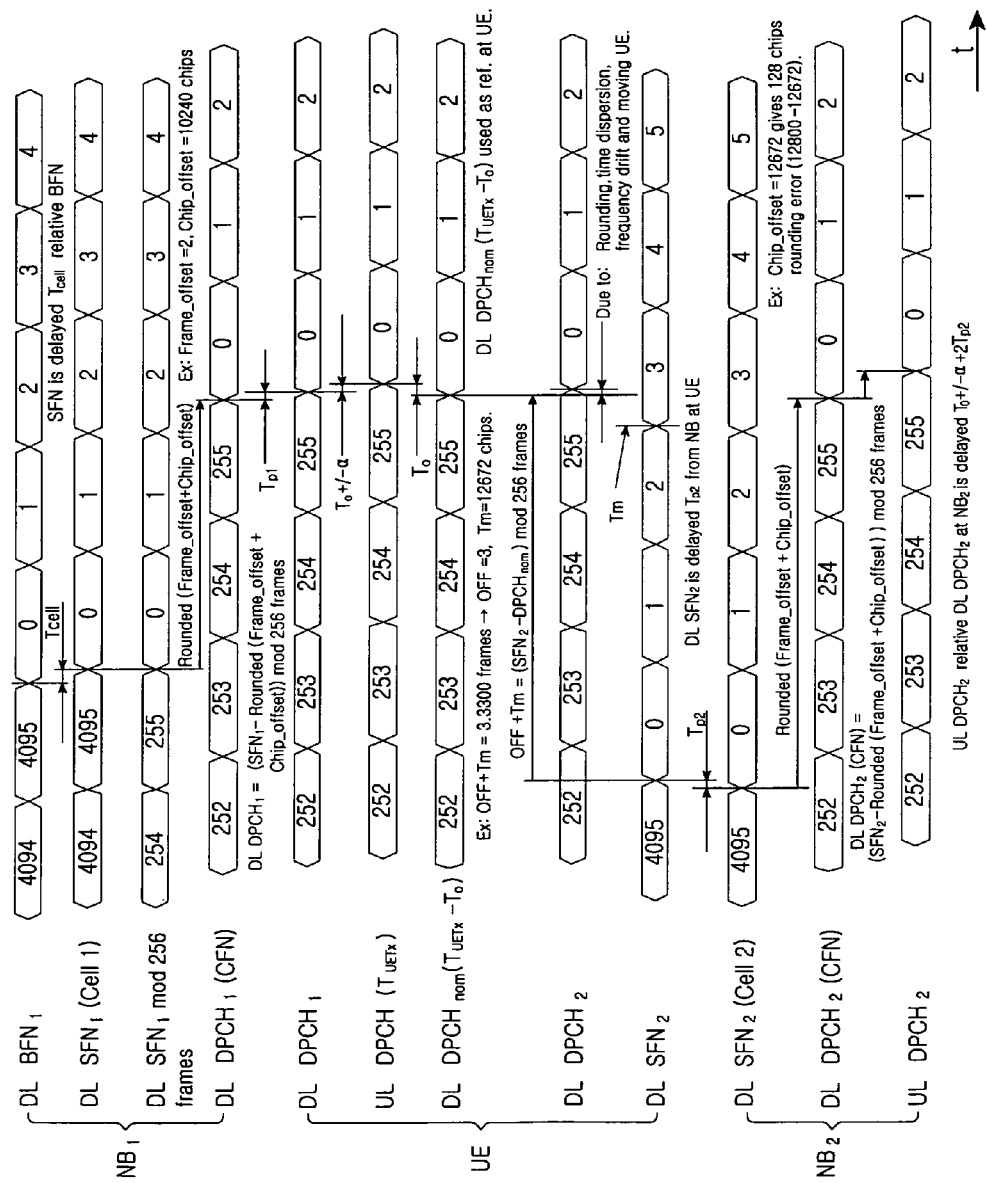
FIG. 9 illustrates the timing of a Node B and a User Equipment (UE) at a hard handover time in the WCDMA system.

FIG. 9 illustrates the timing of a Node B and a UE at a hard handover time in the WCDMA system.

In FIG. 9, a Node B Frame Number (BFN) is a unique frame number (0~4095) for one Node B, and a System Frame Number (SFN) is a unique frame number (0~4095) for one cell. A difference of T_Cell is present between the BFN and the SFN. T_Cell denotes a delay of the SFN relative to the BFN. T_Cell is a value assigned to one cell, and is used to compute the SFN from the BFN. That is, many cells belonging to one Node B has the same BFN, and T_Cell determines a timing difference between the cells. If cells belonging to one Node B use the same T_Cell, all the cells use the same BFN and the same SFN.

In FIG. 9, "a" denotes the first received Downlink Dedicated Physical CHannel (DL DPCH) finger relative to a normal DL DPCH. A Connection Frame Number (CFN) is a connection frame number relative to the DPCH and is assigned only when the UE is in a call connection state. "HO" denotes the handover, and "NBx" denotes the Node B. Concretely, x (=1) denotes the source Node B and x (=2) denotes the target Node B.

"OFF" denotes an offset with a range from 0 to 255 frames, and "RFN" denotes an RNC frame number.

"Tm" denotes a value measured by the UE at the handover time, and has a range from 0 to 38399 chips. "To" denotes a constant of 1024 chips, and is the nominal difference between the first received DPCH finger (DL DPC $H_{nom}$) and $T_{UETx}$ at the UE. "$T_{UETx}$" denotes the time when the UE transmits an Uplink (UL) DPCH: "$T_{px}$" denotes a propagation delay from the UE to Cell X.

A frame offset is defined as a difference between the SFN and the CFN in a unit of 10 ms. A chip offset is defined in a unit of one chip, and is a value computed by excluding the frame offset from the difference between the SFN and the CFN. The OFF value is defined as a difference between the current CFN and the SFN of a target cell in a unit of 10 ms. The Tm value is defined as a value computed by excluding the OFF value from the difference between the current CFN and the SFN of the target cell.

FIG. 9 illustrates a handover process from the source Node B ($NB_1$) and the target Node B ($NB_2$) for the UE.

The FA1 frequency of the source Node B of FIG. 4(a) corresponds to the frequency of $NB_1$ of FIG. 9. The FA1 frequency of the target Node B of FIG. 4(a) corresponds to the frequency of $NB_2$ of FIG. 9.

Assuming that the T_Cell value of $NB_1$ is 1, the frame offset is 2, the chip offset is 10240, the OFF value is 3, and the Tm value is 12672 (where the frame offset of 1 and the OFF value of 1 correspond to 10 ms and 38400 chips), a difference between the SFNs can be obtained by computing a difference between offset information (2*38400+10240 [chips]) of $NB_1$ serving as the source Node B and measured offset information (3*38400+12672 [chips]) of $NB_2$ serving as the target Node B. The obtained difference is converted to Diff_Frame in the 10 ms unit and Diff_Chip in the chip unit. That is, the difference between the SFNs is Diff_Frame+Diff_Chip.

Diff_Frame=(((2+256)*38400+10240−3*38400−12672)/38400) mod 256=254, and Diff_Chip=((2+256)*38400+10240−3*38400−12672) mod 38400=35986. Herein, the frame offset is added to 256 in order to obtain a computation result that is not less than "0". The difference between the SFNs of $NB_1$ and $NB_2$ is Diff_Frame of 254 and Diff_Chip of 35986, and is stored in the RNC.

On the other hand, because a value to be used in the present invention is a timing difference between the FA2 frequency of $NB_1$ and the FA1 frequency of $NB_2$, a timing difference between the FA1 frequency of $NB_1$ and the FA1 frequency of $NB_2$ is computed at the soft handover time and is stored as information about a timing difference between the Node Bs in the RNC. Subsequently, a timing difference between the FA1 frequency of $NB_1$ and the FA2 frequency of $NB_1$ is computed.

The timing difference between the FA1 and FA2 frequencies of $NB_1$ is a difference within the same Node B. This difference corresponds to T_Cell. That is, when T_Cell of the FA2 frequency of $NB_1$ is 2, T_Cell of the FA1 frequency of $NB_1$ is 1. Thus, the timing difference between the FA1 and FA2 frequencies of $NB_1$ is 256 chips (1 T_Cell=256 chips).

Subsequently, the timing difference between the FA2 frequency of NB1 and the FA1 frequency of NB2 is computed as follows.

Diff($NB_1$ FA2←→$NB_2$ FA1)=Diff ($NB_1$ FA1←→$NB_2$ FA1)−Diff ($NB_1$ FA1←→$NB_1$ FA2). When Diff_Frame_1 in the 10 ms unit and Diff_Chip_1 in the chip unit are computed, Diff_Frame_1=254 and Diff_Chip_1=35986−256=35730.

Assuming that a frame offset and a chip offset of the UE in a call connection state at the FA2 frequency of $NB_1$ is 1 and 1024, respectively, a difference between offset information (1*38400+1024 [chips]) currently being used in the UE in the call connection state at the FA2 frequency of $NB_1$ and offset information (254*38400+35730 [chips]) between the FA2 and FA1 frequencies of $NB_1$ stored through the process of FIG. 4 is computed. The computed difference is Calculated_OFF in the 10 ms unit and Calculated_Tm in the chip unit.

That is, an OFF value (i.e., an offset in the 10 ms unit) and a Tm value (i.e., a difference in the chip unit) reported from the UE are used between the same frequencies as illustrated in FIG. 4. Because the UE does not report timing difference information between different frequencies, the system processes the handover by computing Calculated_OFF and Calculated_Tm, assuming Calculated_OFF as the OFF value reported from the UE, and assuming Calculated_Tm as the Tm value reported from the UE.

Calculated_OFF=(((1+256)*38400+1024−254*38400−35730)/38400) mod 256=2, and Calculated_Tm=((1+256)*38400+1024−254*38400−35730) mod 38400=3694.

When the conventional handover is performed, a difference between the SFNs of the FA2 frequency of $NB_1$ and the FA1 frequency of $NB_2$ cannot be detected because the process of FIG. 4 is not performed. In this conventional handover process, the UE computes a new CFN in a timing re-initialized scheme. However, in accordance with exemplary embodiments of the present invention, a difference between the SFNs of the FA2 frequency of $NB_1$ and the FA1 frequency of $NB_2$ is computed in the RNC and the UE can maintain the current CFN in a timing maintained scheme.

When a hard handover is performed in accordance with exemplary embodiments of the present invention, timing difference information unreported from a UE is computed and the UE uses previously maintained timing difference information rather than new timing difference information. At the hard handover time, the UE does not perform a new synchronization acquisition process, such that a hard handover success probability increases. Because a new synchronization acquisition time is not required, a call cut-off time can be reduced in an interfrequency hard handover.

As is apparent from the above description, exemplary embodiments of the present invention improve the performance of a hard handover and increase a hard handover success probability. Moreover, exemplary embodiments of the present invention improve the performance of an RNC for performing the hard handover and the performance of a mobile telecommunication system with the RNC.

Although the exemplary embodiments of the present invention have been disclosed for illustrative purposes, the present invention is not limited to the above-described embodiments. Those skilled in the art will appreciate that various modifications, additions, and substitutions are possible, without departing from the scope of the present invention and the full scope of equivalents thereof.

What is claimed is:

1. A Radio Network Controller (RNC) in a mobile telecommunication system for supporting a handover for a User Equipment (UE), comprising:

a memory for storing a first timing difference information between a first Node B and a second Node B;

a calculator for computing a second timing difference information between a second frequency of the first Node B and a first frequency of the second Node B using the stored first timing difference information and a third timing difference information between the first and second frequencies of the first Node B, when receiving, from the UE, a request for a handover from the second frequency of the first Node B to the first frequency of the second Node B; and a transmitter for commanding the second Node B and the UE to operate for the handover from the second frequency of the first Node B to the first frequency of the second Node B using the computed second timing difference information.

2. The RNC of claim 1, wherein the transmitter commands the second Node B to set up a channel based on synchronization of the UE at the first frequency of the second Node B using the computed second timing difference information.

3. The RNC of claim 1, wherein the first timing difference information is timing difference between the first frequency of the first Node B and the first frequency of the second Node B.

4. The RNC of claim 1, wherein the transmitter commands the UE to operate for the handover to the second Node B without a new synchronization acquisition relative to the second Node B.

5. The RNC of claim 1, wherein the transmitter determines whether the stored first timing difference information is valid, and commands the second Node B and the UE to operate for the handover according to a determination result.

6. The RNC of claim 5, wherein the transmitter determines that the stored first timing difference information is invalid when the first or second Node B is re-started after the first timing difference information is stored.

7. The RNC of claim 1, wherein the calculator computes a difference value between System Frame Numbers (SFNs) of the first frequencies of the first and second Node Bs, the difference value being stored as the first timing difference information in the memory.

8. The RNC of claim 7, wherein the calculator computes a delay value of an SFN relative to a Node B Frame Number (BFN) of the first and second frequencies of the first Node B, subtracts the delay value from the difference value, and computes the second timing difference information.

9. A handover method in a mobile telecommunication system in which a Radio Network Controller (RNC) supports a handover for a User Equipment (UE), comprising the steps of:

storing a first timing difference information between a first Node B and a second Node B;

computing a second timing difference information between a second frequency of the first Node B and a first frequency of the second Node B using the stored first timing difference information and a third timing difference information between the first and second frequencies of the first Node B, when receiving, from the UE, a request for a handover from the second frequency of the first Node B to the first frequency of the second Node B; and commanding the second Node B and the UE to operate for the handover from the second frequency of the first Node B to the first frequency of the second Node B using the computed second timing difference information.

10. The handover method of claim 9, wherein the first timing difference information is the timing difference between the first frequency of the first Node B and the first frequency of the second Node B.

11. The handover method of claim 9, wherein the commanding step comprises the step of:

commanding the second Node B to set up a channel based on synchronization of the UE at the first frequency using the computed second timing difference information.

12. The handover method of claim 9, wherein the commanding step comprises the step of:

commanding the UE to operate for the handover to the second Node B without a new synchronization acquisition relative to the second Node B.

13. The handover method of claim 9, wherein the storing step comprises the steps of:

computing a difference value between System Frame Numbers (SFNs) of the first frequencies of the first and second Node Bs; and storing the difference value as the first timing difference information.

14. The handover method of claim 13, wherein the computing step comprises the steps of:

computing a delay value of an SFN relative to a Node B Frame Number (BFN) of the first and second frequencies of the first Node B;

subtracting the delay value from the difference value; and computing the second timing difference information.

15. The handover method of claim 9, further comprising the step of:

determining whether the stored first timing difference information is valid, wherein the commanding step comprises the step of:

commanding the second Node B and the UE to operate for the handover according to a determination result.

16. The handover method of claim 15, wherein the determining step comprises the step of:

determining that the stored first timing difference information is invalid when the first or second Node B is re-started after the first timing difference information is stored.

* * * * *